(12) United States Patent
Kornman et al.

(10) Patent No.: US 12,158,967 B2
(45) Date of Patent: Dec. 3, 2024

(54) E-MAIL ADDRESS VERIFICATION

(71) Applicant: Capital One Services, LLC, McLean, VA (US)

(72) Inventors: Kelly Morse Kornman, Mechanicsville, VA (US); Aaron Wright, Bear, DE (US); Omer Alrefaai, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 202 days.

(21) Appl. No.: 18/054,430

(22) Filed: Nov. 10, 2022

(65) Prior Publication Data

US 2024/0160760 A1    May 16, 2024

(51) Int. Cl.
   *G06F 21/62* (2013.01)
(52) U.S. Cl.
   CPC .................. *G06F 21/6218* (2013.01)
(58) Field of Classification Search
   CPC ....... G06F 21/6218; G06F 21/31; H04L 63/08
   See application file for complete search history.

(56) References Cited

U.S. PATENT DOCUMENTS

2013/0013927 A1* 1/2013 Stibel ............... G06Q 50/01
   713/172

* cited by examiner

*Primary Examiner* — Izunna Okeke
(74) *Attorney, Agent, or Firm* — Harrity & Harrity, LLP (57) ABSTRACT

In some implementations, a system may receive a first request including a user internet protocol (IP) address associated with the first request, and a user e-mail address associated with an e-mail account of a user. The system may store the submission IP address in association with the first request. The system may transmit a confirmation e-mail message to the user e-mail address. The confirmation e-mail message may include image data associated with the first request. The system may receive, from an e-mail client associated with the user e-mail account, a second request to access the image data. The second request may include a confirmation IP address. The system may perform a comparison of the requesting and submission IP addresses and the submission IP address. The system may transmit, to the e-mail client, an image associated with the image data and based on the comparison.

20 Claims, 7 Drawing Sheets

E-MAIL ADDRESS VERIFICATION

BACKGROUND

Electronic mail (e-mail) is a method of exchanging messages between people using electronic devices. E-mail systems are based on a store-and-forward model. E-mail servers accept, forward, deliver, and store messages. Businesses use e-mail for a variety of purposes, including e-mail marketing via opt-in. In some forms of opt-in e-mail marketing, a business sends a new subscriber a confirmation e-mail for the new subscriber to verify that it was the e-mail address owner that subscribed to the business's service or mailing list.

SUMMARY

Some implementations described herein relate to a system for verifying an e-mail address. The system may include one or more memories and one or more processors communicatively coupled to the one or more memories. The one or more processors may be configured to receive user request data based on a request made by a user with an interaction party. The user request data may include a submission internet protocol (IP) address and a user e-mail address associated with the user request. The one or more processors may be configured to generate an image uniform resource locator (URL) associated with the user request. The one or more processors may be configured to store the image URL and the submission IP address in a database. The image URL and the submission IP address may be associated with one another in the database. The one or more processors may be configured to generate a confirmation e-mail message that includes the image URL. The one or more processors may be configured to transmit, to an e-mail server associated with the user e-mail address, the confirmation e-mail message. The one or more processors may be configured to receive image request data indicating an image request to access an image associated with the image URL. The image request may be generated from an e-mail client associated with the user e-mail address, and may be made in connection with the image URL. The image request data may include a confirmation IP address. The one or more processors may be configured to compare the confirmation IP address and the submission IP address. The one or more processors may be configured to transmit, to the e-mail client and based on a determination that the confirmation IP address and the submission IP address match, the image. The image may indicate that the e-mail address has been verified.

Some implementations described herein relate to a method of verifying an e-mail address. The method may include receiving, by a system having one or more processors, a first request made by a user with an interaction party associated with the system, wherein the first request may include a submission IP address associated with the first request, and wherein the first request may include a user e-mail address associated with an e-mail account of the user. The method may include storing, by the system, the submission IP address in association with the first request. The method may include transmitting, by the system, a confirmation e-mail message to the user e-mail address included in the first request, wherein the confirmation e-mail message may include image data associated with the first request. The method may include receiving, by the system and from an e-mail client associated with the user e-mail account, a second request to access the image data, wherein the second request may include a confirmation IP address. The method may include performing, by the system, a comparison of the confirmation IP address and the submission IP address. The method may include transmitting, by the system and to the e-mail client, an image associated with the image data, wherein the image may be based on the comparison of the confirmation IP address and the submission IP address.

Some implementations described herein relate to a non-transitory computer-readable medium that stores a set of instructions for a device. The set of instructions, when executed by one or more processors of the device, may cause the device to receive, from an e-mail client associated with an e-mail address of a user, an image request to access image data in an e-mail message. The image request may include a confirmation IP address. The set of instructions, when executed by one or more processors of the device, may cause the device to compare the confirmation IP address with a submission IP address stored in a cache. The submission IP address may be associated with a user request made by the user with an interaction party from whom the e-mail message originated. The set of instructions, when executed by one or more processors of the device, may cause the device to transmit, to the e-mail client associated with the user, a first image based on a determination that the confirmation IP address and the submission IP address match. The first image may indicate that the e-mail address is verified. The set of instructions, when executed by one or more processors of the device, may cause the device to transmit, to the e-mail client, a second image based on a determination that the confirmation IP address and the submission IP address do not match. The second image may indicate that the e-mail address is not verified.

DETAILED DESCRIPTION

The following detailed description of example implementations refers to the accompanying drawings. The same reference numbers in different drawings may identify the same or similar elements.

A user may make a request to sign up with a particular interaction party (e.g., a business or an organization). For example, the user may sign up for an account, a newsletter, and/or updates associated with the interaction party. As part of the sign-up process, the user may be required to provide an e-mail address. In some instances, the interaction party may send, to the e-mail address provided by the user, a confirmation e-mail requiring additional action by the user to confirm that the user is the owner of the e-mail address that was used when signing up with the interaction party. For example, the confirmation e-mail may include a link (e.g., a hyperlink to direct a web browser) that the user may be required to select, which sends data to the interaction party indicating confirmation by the user at the e-mail address provided.

However, in some instances, a user opening the e-mail may not notice that further user action may be required (e.g., by clicking the hyperlink) to verify the e-mail address provided with the initial request (e.g., the sign-up). As a result, it is possible that the user is unable to confirm the request until a later time or at all. Because the request was not confirmed, the interaction party may be left in an indeterminate state with respect to the user's request. To address this indeterminate state, the interaction party may send one or more additional confirmation e-mails. Additionally, or alternatively, the interaction party may cancel the user's request, which may result in the user having to make the request again. In either scenario, computing resources of the interaction party's system, the user's device(s), the user's e-mail server, and/or the interaction party's e-mail server may be unnecessarily expended. Additionally, the user may forgo signing up altogether. Accordingly, it is desirable to have a system that may automatically verify the user's e-mail address to confirm the user's request in response to a confirmation e-mail sent by the interaction party to conserve computing resources of the interaction party's system, the user's device(s), and/or the user's e-mail server.

Some implementations described herein relate to a system that may receive a request to access information from an interaction party (e.g., registering an account with the interaction party). The request may include an Internet protocol (IP) address (e.g., a submission IP address) and a user e-mail address. Based on receiving the request, the system may generate an image URL associated with an image and which may be used to verify the user e-mail address. The image URL may include a random code identifying the submission, including submission of the submission IP address and user e-mail address. The image URL may be stored, such as in a database of the system (e.g., in a cache of a server of the system) or in a separate and/or remote database. Based on the first request, the system may send a confirmation e-mail message, which may include the image URL, to the user e-mail address. The confirmation e-mail, when opened (e.g., by an e-mail client), may include loading an image in the confirmation e-mail (e.g., via the image URL). To load the image, the e-mail client may transmit, to the system (e.g., an image server of the system or in communication with the system), a request (e.g., via the image URL) to access and load the image. Such a request from the e-mail client may include an IP address (e.g., a confirmation IP address). The system may compare the submission IP address and the confirmation IP address. If the submission IP address and the confirmation IP address match, then the user e-mail address is verified, and the system may transmit an image to the user device (e.g., to the e-mail client) to be loaded in the confirmation e-mail message. The image associated with the image URL may indicate to the user that the user e-mail has been verified. If the submission IP address and the confirmation IP address do not match, then the user e-mail address is not verified, and the system may transmit an image to the user device (e.g., to the e-mail client) to be loaded in the confirmation e-mail message. The image associated with the image URL may indicate to the user that the user e-mail has been not verified. The image may provide information or a hyperlink to perform a further verification.

By relying on a system to verify the e-mail address based on information included in the requests, user interaction may not be needed, and as a result, the verification process to complete a particular user request (e.g., registration of an account) may be efficiently and timely performed without interaction by the user (e.g., clicking a hyperlink within an e-mail). Accordingly, computing resources of the user (e.g., a user device) and/or of the interaction party (e.g., an image server) may be conserved by not having to perform separate verification tasks that are performed by the system (e.g., comparing IP addresses) and/or to remedy those tasks not being performed (e.g., by sending additional e-mail messages and/or starting all over the request process). Furthermore, by ensuring that the IP address associated with the initial request (e.g., the sign-up) and the IP address associated with the image request (e.g., as part of confirming the sign-up) are the same, the likelihood that the user associated with the e-mail address did indeed perform the initial request is increased, thereby enhancing security and fraud protection.

FIGS. 1A-1D are diagrams of an example 100 associated with e-mail address verification. As shown in FIGS. 1A-1D, example 100 includes a user device, an e-mail verification system, a database, an image server, and a user e-mail server. These devices are described in more detail in connection with FIGS. 2 and 3.

Figure 1A:
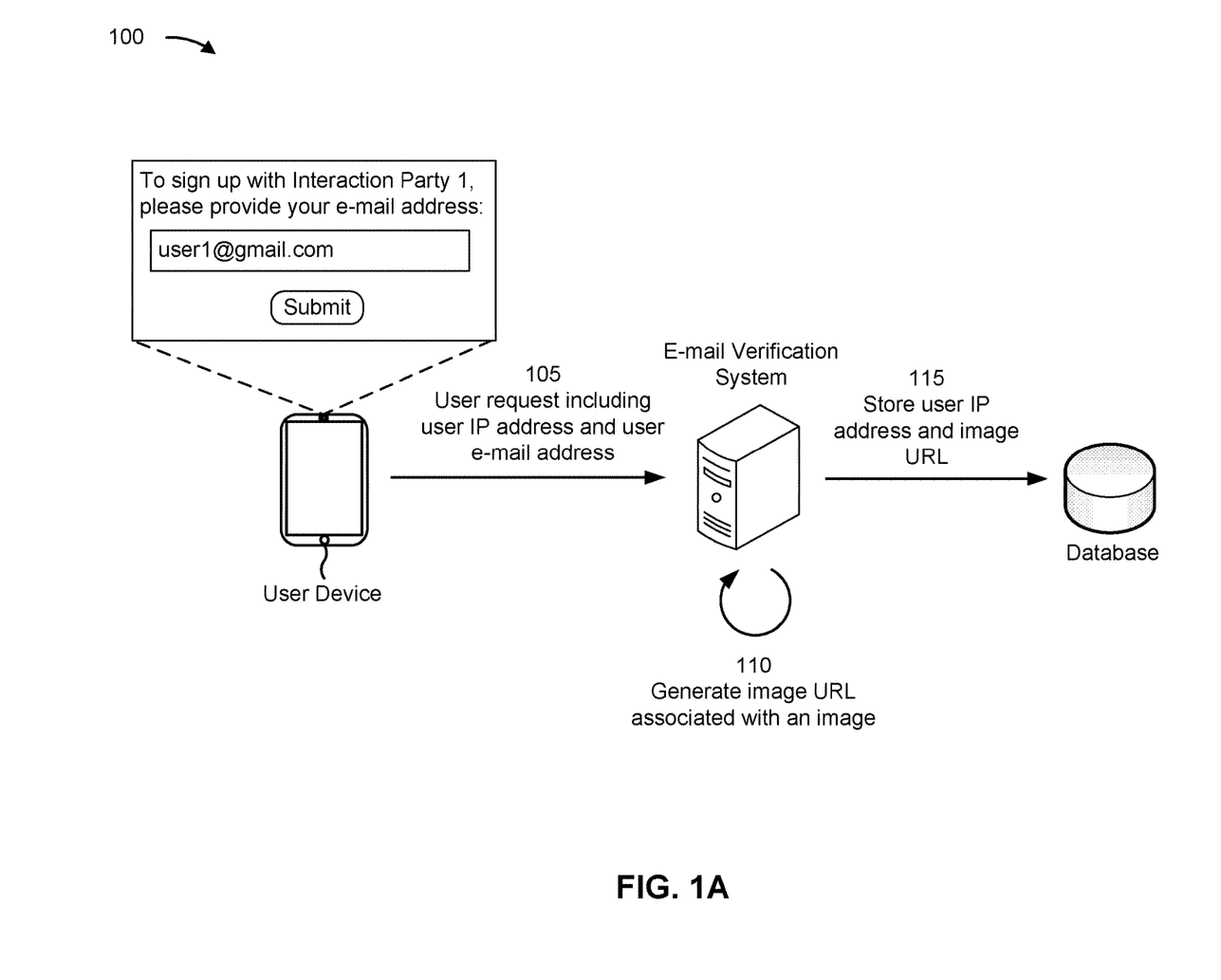
FIGS. 1A-1D are diagrams of an example associated with e-mail address verification, in accordance with some embodiments of the present disclosure.

As shown in FIG. 1A, a user may make a request with an interaction party (e.g., a news provider, a service provider, or a merchant) to access information from the interaction party. For example, the user may register for an account with the interaction party. As another example, the user may sign-up for a newsletter or updates (e.g., sales or new products) associated with the interaction party. The user may perform the request on the user device (e.g., via an application associated with the interaction party and installed on the user device or via a web-based application of the interaction party accessed by the user device over a network). The user may be required to provide (e.g., via the user device) information as part of the request. For example, the user device may present one or more entry fields in which information, such as the user's e-mail address, may be entered. Other request information may include the user's name, the user's address, the user's birthdate, the user's financial or payment information, a username, and/or a password.

As shown by reference number 105, the user device may transmit, and the e-mail verification system may receive, the request (also referred to as the user request or the first request). User request data associated with the user request may include a user e-mail address associated with an e-mail account of the user. The user request data also may include an IP address (also referred to as the submission IP address) associated with the user request (e.g., an IP address of the user device from which the user request is submitted).

As shown by reference number 110, based on receiving the user request, the e-mail verification system may generate image data associated with an image and with the user request. For example, the a URL (also referred to as the image URL) associated with an image and with the user request. The image URL may be randomly generated with a random query parameter and/or code such that the image URL may be unique to the user request. For example, the URL may include a string of random alphanumeric characters and/or symbols. The number of the random alphanumeric characters and/or symbols may vary for different user requests, thereby contributing to the uniqueness to each user request. The image may be accessed and/or loaded via the image URL, as described in more detail below. The image may indicate whether or not the user e-mail address has been verified. For example, a first image associated with the image URL may indicate that the user e-mail address has been verified, and a second image associated with the image URL may indicate that the user e-mail address has not been verified. Alternatively, in some implementations, the URL may be preexisting (e.g., does not need to be generated) and associated with the image.

As shown by reference number 115, the e-mail verification system may store the submission IP address and the image URL (or the random query portion of the image URL) in a record to be accessed later (e.g., by the e-mail verification system or by the image server, as described in more detail below). The e-mail verification system may store the user request data in a database. The user request data may be permanently stored or may be temporarily stored (e.g., in a cache).

Figure 1B:
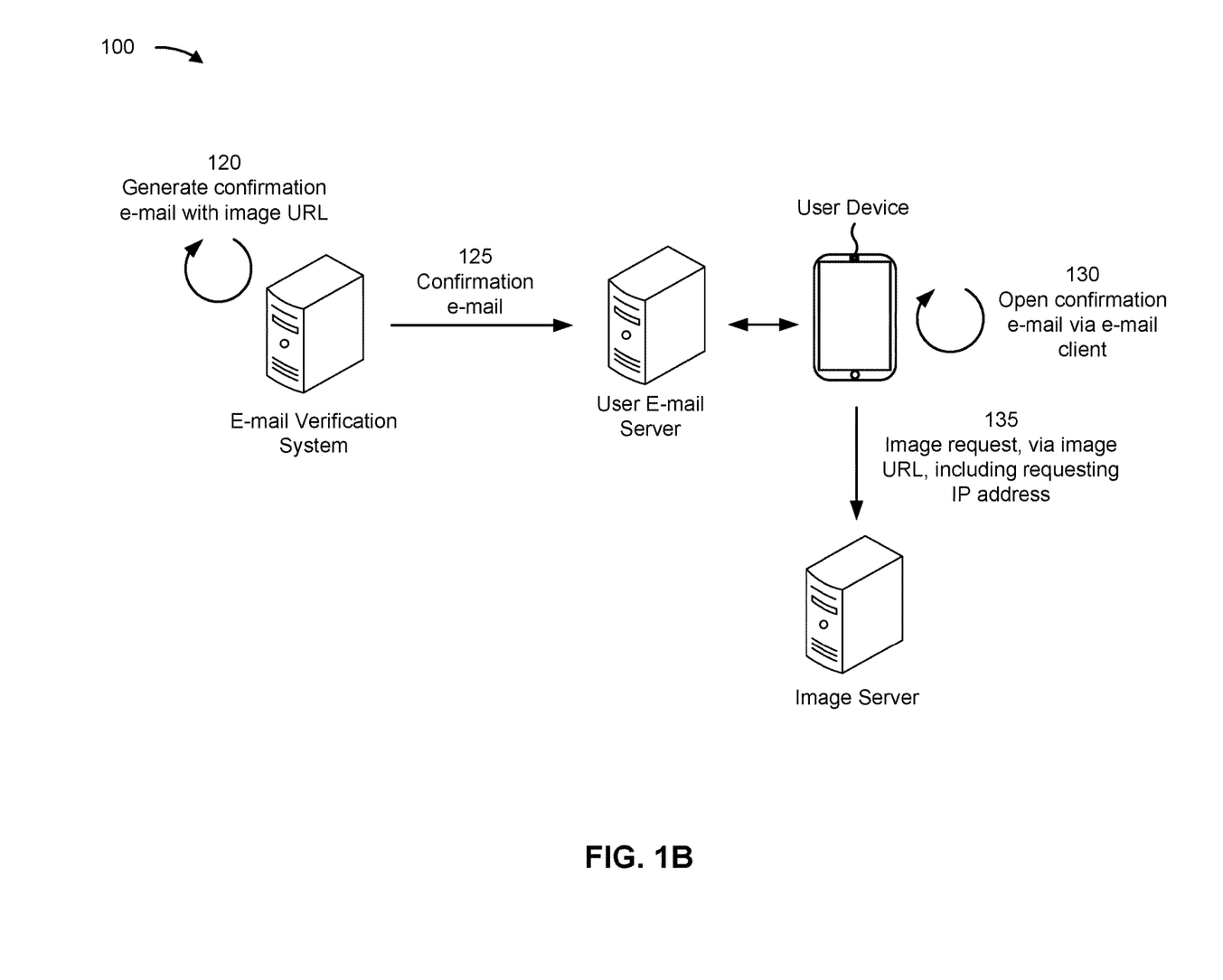

As shown in FIG. 1B, after receiving the request, the e-mail verification system may initiate an e-mail verification process to verify the user e-mail address associated with the user request. As shown by reference number 120, the e-mail verification system may generate a confirmation e-mail message. The confirmation e-mail message may include the image URL from which the image may be accessed and loaded into the confirmation e-mail message when opened (e.g., by an e-mail client). As shown by reference number 125, the e-mail verification system may transmit, by way of an e-mail server, the confirmation e-mail message to the e-mail account associated with the user e-mail address. As shown by reference number 130, the user device may open, via an e-mail client installed on or accessed via the user device, the confirmation e-mail message. The confirmation e-mail message may include the image URL to load an image within the e-mail. The image URL may return an image, where the returned image may be based on whether or not the user e-mail address is verified (e.g., the message image associated with the image URL may be the first image associated with a verified e-mail address or the second image associated with a non-verified e-mail address).

As shown by reference number 135, to load the message image in the confirmation e-mail message, the e-mail client may transmit, and the image server may receive, an image request based upon the image URL (also referred to as a second request). The e-mail client may automatically request to load the message image in the confirmation e-mail message. Alternatively, the user may be required to perform an interaction with the confirmation e-mail message to load the message image (e.g., manually selecting to download message images). In either scenario, image request data associated with the image request may include the image URL and an IP address (also referred to as the confirmation IP address) associated with the image request.

Figure 1C:
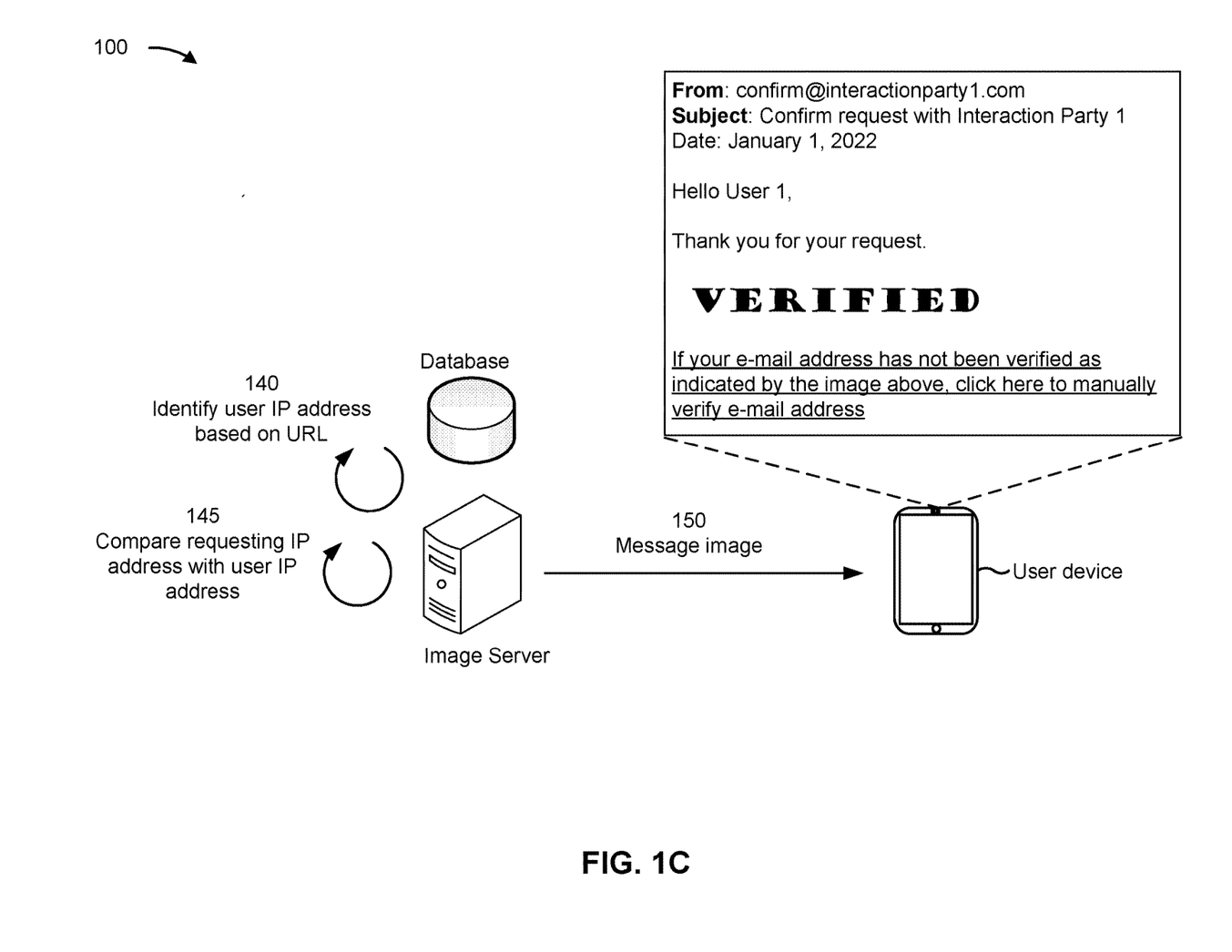

As shown in FIG. 1C, and by reference number 140, the image server may identify the submission IP address based on the request for the message image. For example, the image server may have access to the database. Based on the image URL (e.g., containing the random query portion) via which the message image request was made, the image server may identify the record stored in the database in association with reference number 115. As shown by reference number 145, the image server may compare the confirmation IP address, from the image URL, with the submission IP address. If the confirmation IP address and the submission IP address match, then the user e-mail address is verified. Alternatively, if the confirmation IP address and the submission IP address do not match, then the user e-mail address is unverified. In some implementations, based on the comparison, the e-mail address may be marked as verified or unverified (e.g., under a user account with which the user e-mail address is associated) in the database.

As shown by reference number 150, the image server may transmit, to the user device (e.g., to the e-mail client) an image to be loaded and displayed as the message image in the confirmation e-mail address. The image transmitted may be based on the comparison of the confirmation IP address and the submission IP address. For example, if the confirmation IP address and the submission IP address match, and the user e-mail address is verified, then the image transmitted (e.g., the first image) may indicate that the user e-mail address has been verified. Alternatively, if the confirmation IP address and the submission IP address do not match, and the user e-mail address is unverified, then the image transmitted (e.g., the second image) may indicate that the user e-mail address has not been verified. In some implementations, the second image may include instructions to the user to take one or more additional steps to verify the e-mail address (e.g., by activating a hyperlink included in the confirmation e-mail message to manually verify the e-mail address). Additionally, or alternatively, the e-mail verification system may transmit, to the user device, a notification (e.g., separate from the confirmation e-mail) that the e-mail address has not been verified. The notification may be provided as an e-mail, a short message service (SMS) message, and/or as an in-application message.

Figure 1D:
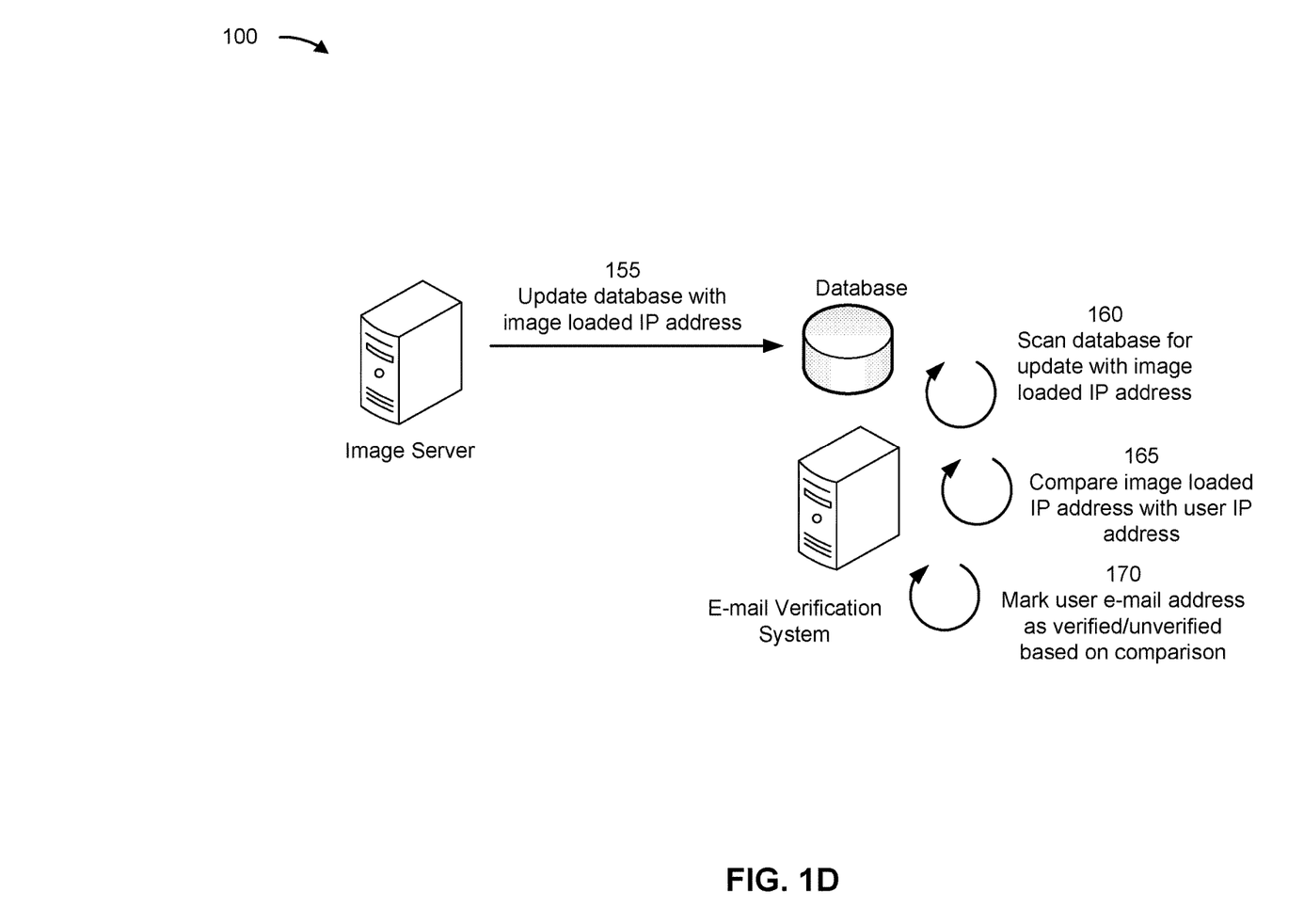

As shown in FIG. 1D, and by reference number 155, in some implementations, the image server may update and populate the database with an image loaded IP address (e.g., the IP address corresponding to the user device on which the message image was loaded). The image loaded IP address may correspond to (e.g., be the same as) the confirmation IP address. In some implementations, the image server may update the database with the confirmation IP address in addition to or in lieu of the image loaded IP address. As shown by reference number 160, the e-mail verification system may scan the database at set time intervals (e.g., every 2 minutes, 5 minutes, or 30 minutes) for an update including the image loaded IP address (or the confirmation IP address). As shown by reference number 165, based on identifying the image loaded IP address from the database, the e-mail verification system may compare the image loaded IP address with the submission IP address stored in the database. As shown by reference number 170, based on the comparison, the e-mail verification system may mark the user e-mail address (e.g., under the user account with which the user e-mail address is associated) as verified if the image loaded IP address and the submission IP address match, or unverified if the image loaded IP address and the submission IP address do not match.

In some implementations, the image server may update the database and the record associated with the user request with a match status indicating a match or no match between the submission IP address and the confirmation IP address. The e-mail verification system may poll the database for such an update. Based on the match status, the e-mail verification system may mark the user e-mail address as verified or unverified.

As described above, the e-mail verification system is able to verify the e-mail address of a user provided in connection with a first request by the user with an interaction party. Based on a comparison of an IP address (e.g., the submission IP address) associated with the first request and an IP address (e.g., the confirmation IP address) associated with a second request to load an image in a confirmation e-mail message sent in connection with the first request, the e-mail verification system is able to verify the e-mail address. For example, if the submission IP address and the confirmation IP address match, then the e-mail address may be verified, and the process associated with the first request may be complete. If the submission IP address and the confirmation IP address do not match, then the e-mail address may be unverified, which may require further action by the user to verify the e-mail address and complete the first request process. The image transmitted by the system to a user device (e.g., an e-mail client installed on or accessed via the user device) and displayed in the confirmation e-mail message may indicate, to the user, whether or not the e-mail address has been verified, and whether or not such further action may be required.

In this way, user interaction may not be needed, and as a result, the verification process to complete a particular user request (e.g., registration of an account) may be efficiently and timely performed. Accordingly, computing resources of the user (e.g., a user device) and/or of the interaction party (e.g., an image server) may be conserved by not having to perform separate verification tasks that are performed by the system (e.g., comparing IP addresses) and/or to remedy those tasks not being performed (e.g., by sending additional e-mail messages and/or starting all over the request process).

As indicated above, FIGS. 1A-1D are provided as an example. Other examples may differ from what is described with regard to FIGS. 1A-1D. For example, in some implementations, the e-mail verification system and the image server may be the same system and/or server.

Figure 2:
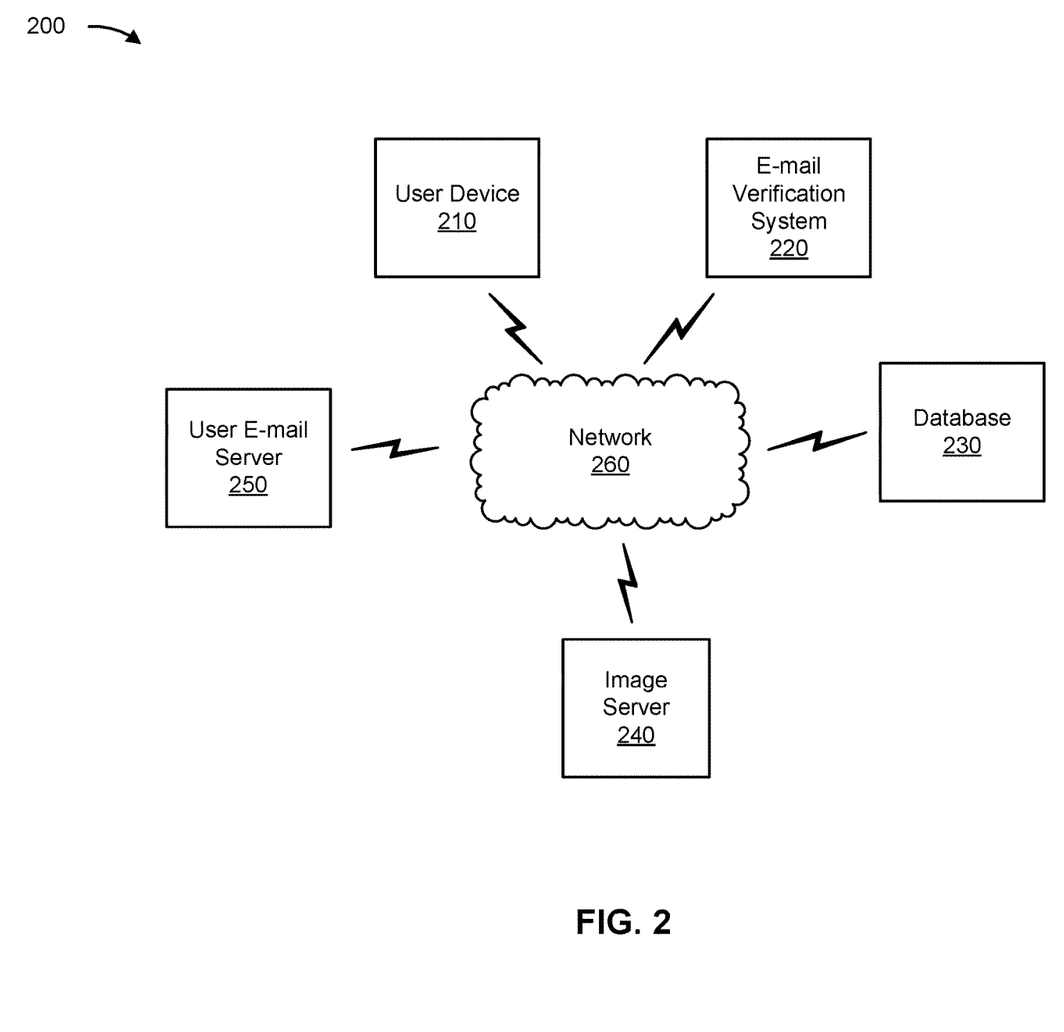
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, an e-mail verification system 220, a database 230, an image server 240, a user e-mail server 250, and/or a network 260. Devices of environment 200 may interconnect via wired connections, wireless connections, or a combination of wired and wireless connections.

The user device 210 may include one or more devices capable of receiving, generating, storing, processing, and/or providing information associated with e-mail address verification, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The e-mail verification system 220 may include one or more devices capable of receiving, generating, storing, processing, providing, and/or routing information associated with e-mail address verification, as described elsewhere herein. The e-mail verification system 220 may include a communication device and/or a computing device. For example, the e-mail verification system 220 may include a server, such as an application server, a client server, a web server, a database server, a host server, a proxy server, a virtual server (e.g., executing on computing hardware), or a server in a cloud computing system. In some implementations, the e-mail verification system 220 includes computing hardware used in a cloud computing environment.

The database 230 may include one or more devices capable of receiving, generating, storing, processing, and/or providing information associated with e-mail address verification, as described elsewhere herein. The database 230 may include a communication device and/or a computing device. For example, the database 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the database 230 may store user request data (e.g., a confirmation IP address and image data associated a user request made by a user with an interaction party), as described elsewhere herein.

The image server 240 may include one or more devices capable of receiving, generating, storing, processing, providing, and/or routing information associated with e-mail address verification, as described elsewhere herein. The image server 240 may include a communication device and/or a computing device. For example, the image server 240 may include a server, such as an application server, a client server, a web server, a database server, a host server, a proxy server, a virtual server (e.g., executing on computing hardware), or a server in a cloud computing system. In some implementations, the image server 240 includes computing hardware used in a cloud computing environment.

The user e-mail server 250 may include one or more devices capable of receiving, generating, storing, processing, providing, and/or routing information associated with e-mail address verification, as described elsewhere herein. The user e-mail server 250 may include a communication device and/or a computing device. For example, the user e-mail server 250 may include a server, such as an application server, a client server, a web server, a database server, a host server, a proxy server, a virtual server (e.g., executing on computing hardware), or a server in a cloud computing system. In some implementations, the user e-mail server 250 includes computing hardware used in a cloud computing environment.

The network 260 may include one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
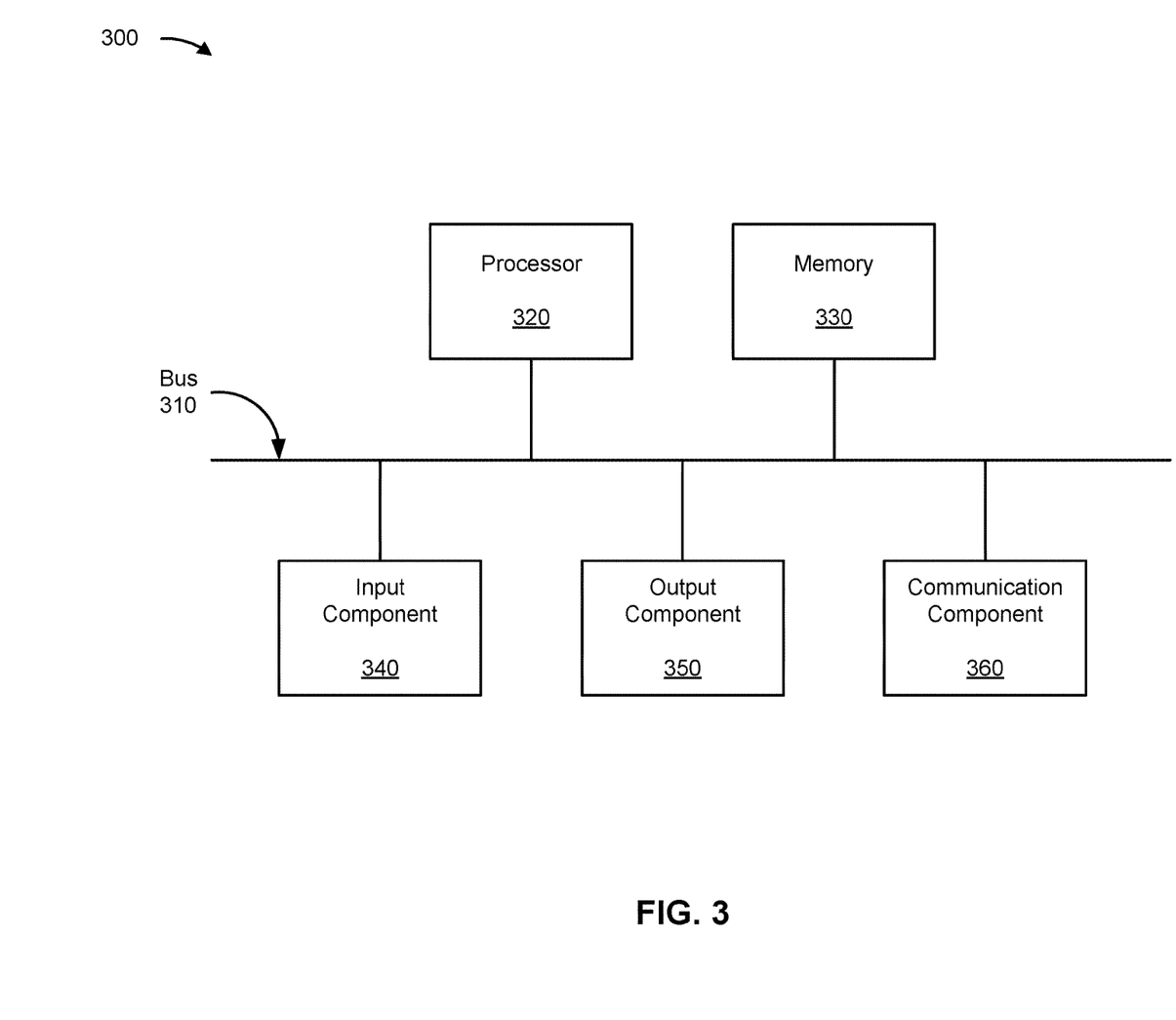
FIG. 3 is a diagram of example components of a device associated with e-mail address verification, in accordance with some embodiments of the present disclosure.

FIG. 3 is a diagram of example components of a device 300 associated with e-mail address verification. Device 300 may correspond to user device 210, e-mail verification system 220, database 230, image server 240, and/or user e-mail server 250. In some implementations, user device 210, e-mail verification system 220, database 230, image server 240, and/or user e-mail server 250 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 may enable device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
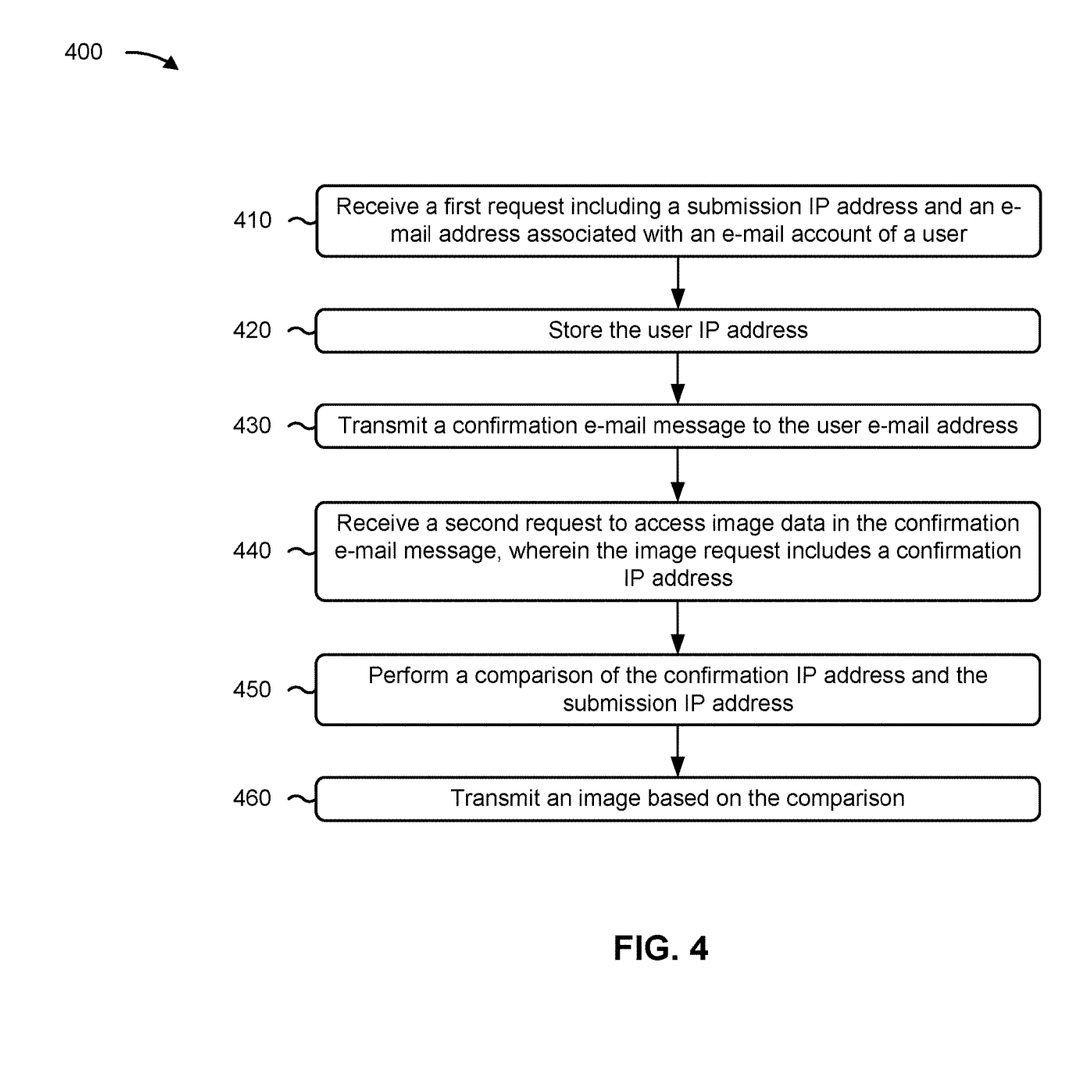
FIG. 4 is a flowchart of an example process associated with e-mail address verification, in accordance with some embodiments of the present disclosure.

FIG. 4 is a flowchart of an example process 400 associated with e-mail address verification. In some implementations, one or more process blocks of FIG. 4 may be performed by the e-mail verification system 220 and/or image server 240. In some implementations, one or more process blocks of FIG. 4 may be performed by one or more components of the device 300, such as processor 320, memory 330, input component 340, output component 350, and/or communication component 360.

As shown in FIG. 4, process 400 may include receiving a first request including a submission IP address and a user e-mail address associated with an e-mail account of a user (block 410). For example, the e-mail verification system 220 and/or the image server 240 (e.g., using processor 320, memory 330, input component 340, and/or communication component 360) may receive a first request made by a user with an interaction party associated with the system, wherein the first request includes a submission IP address associated with the first request, and wherein the first request includes a user e-mail address associated with an e-mail account of the user, as described above in connection with reference number 105 of FIG. 1A. As an example, the user device may transmit, and the e-mail verification system may receive, a user request (also referred to as a first request). User request data associated with the request may include a user e-mail address and a submission IP address associated with the user request (e.g., an IP address of the user device from which the user request is made).

As further shown in FIG. 4, process 400 may include storing the submission IP address (block 420). For example, the e-mail verification system 220 and/or the image server 240 (e.g., using processor 320 and/or memory 330) may store the submission IP address in association with the first request, as described above in connection with reference number 115 of FIG. 1A. As an example, the e-mail verification system may store the submission IP address in a database (e.g., a cache of the e-mail verification system).

As further shown in FIG. 4, process 400 may include transmitting a confirmation e-mail message to the user e-mail address (block 430). For example, the e-mail verification system 220 and/or the image server 240 (e.g., using processor 320, memory 330, and/or communication component 360) may transmit a confirmation e-mail message to the user e-mail address included in the first request, wherein the confirmation e-mail message may include image data associated with the first request, as described above in connection with reference number 125 of FIG. 1B. As an example, the e-mail verification system may transmit, by way of an e-mail server, a confirmation e-mail message to an e-mail account associated with the user e-mail address. The confirmation e-mail message may include image data associated with the first request.

As further shown in FIG. 4, process 400 may include receiving a second request to access image data in the confirmation e-mail message, wherein the second request may include a confirmation IP address (block 440). For example, the e-mail verification system 220 and/or the image server 240 (e.g., using processor 320, memory 330, input component 340, and/or communication component 360) may receive a second request to access the image data, wherein the second request may include a confirmation IP address, as described above in connection with reference number 135 of FIG. 1B. As an example, based on the request to load the image (referred to as the image request or the second request), the user device may transmit, to the image server via an e-mail client associated with the user e-mail address, image request data, including the image request and an IP address (also referred to as the confirmation IP address) associated with the request.

As further shown in FIG. 4, process 400 may include performing a comparison of the confirmation IP address and the submission IP address (block 450). For example, the e-mail verification system 220 and/or the image server 240 (e.g., using processor 320 and/or memory 330) may perform a comparison of the confirmation IP address and the submission IP address, as described above in connection with reference number 145 of FIG. 1C. As an example, image server may compare the confirmation IP address, from the image request data, with the submission IP address.

As further shown in FIG. 4, process 400 may include transmitting an image based on the comparison (block 460). For example, the e-mail verification system 220 and/or the image server 240 (e.g., using processor 320, memory 330, and/or communication component 360) may transmit the image data based on a determination that the confirmation IP address and the submission IP address match, wherein the image associated with the image data indicates that the user e-mail address is verified, as described above in connection with reference number 150 of FIG. 1D. As an example, the image server may transmit, to the e-mail client, an image associated with the image data in the confirmation e-mail message. The image may be based on the comparison of the confirmation IP address and the submission IP address. If the confirmation IP address and the submission IP address match, then the image (e.g., the first image) may indicate that the user e-mail address has been verified. If the confirmation IP address and the submission IP address do not match, then the image (e.g., the second image) may indicate that the user e-mail address has not been verified.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for verifying an e-mail address, the system comprising:
　　one or more memories; and
　　one or more processors, communicatively coupled to the one or more memories, configured to:
　　　receive user request data based on a request made by a user with an interaction party,
　　　　wherein the user request data includes a submission Internet protocol (IP) address and a user e-mail address associated with the user request;
　　　generate an image uniform resource locator (URL) associated with the user request;
　　　store the image URL and the submission IP address in a database,
　　　　wherein the image URL and the submission IP address are associated with one another in the database;
　　　generate a confirmation e-mail message that includes the image URL;

transmit, to an e-mail server associated with the user e-mail address, the confirmation e-mail message, receive image request data indicating an image request to access an image associated with the image URL,
- wherein the image request is generated from an e-mail client associated with the user e-mail address and is made in connection with the image URL, and
- wherein the image request data includes a confirmation IP address;

compare the confirmation IP address and the submission IP address; and transmit, to the e-mail client and based on a determination that the confirmation IP address and the submission IP address match, the image,
- wherein the image indicates that the e-mail address has been verified.

2. The system of claim 1, wherein the one or more processors are further configured to:
update the database with an image loaded IP address corresponding to the confirmation IP address.

3. The system of claim 2, wherein the one or more processors are further configured to:
poll the database, at set intervals, for the image loaded IP address.

4. The system of claim 3, wherein the one or more processors are further configured to:
compare the image loaded IP address with the submission IP address; and
mark the user e-mail address as verified based on a match between the image loaded IP address and the submission IP address.

5. The system of claim 3, wherein the one or more processors are further configured to:
compare the image loaded IP address with the submission IP address; and
mark the user e-mail address as unverified when the image loaded IP address and the submission IP address do not match.

6. The system of claim 1, wherein the image URL is randomly generated with a random query parameter.

7. The system of claim 1, wherein the database is a cache of the system.

8. The system of claim 1, wherein the one or more processors are further configured to:
transmit, to the e-mail client and based on a determination that the confirmation IP address and the submission IP address do not match, a second image indicating that the user e-mail address has not been verified.

9. A method of verifying an e-mail address, comprising:
receiving, by a system having one or more processors, a first request made by a user with an interaction party associated with the system,
- wherein the first request includes a submission Internet protocol (IP) address associated with the first request, and
- wherein the first request includes a user e-mail address associated with an e-mail account of the user;

storing, by the system, the submission IP address in association with the first request;

transmitting, by the system, a confirmation e-mail message to the user e-mail address included in the first request,
- wherein the confirmation e-mail message includes image data associated with the first request;

receiving, by the system and from an e-mail client associated with the e-mail account, a second request to access the image data,
- wherein the second request includes a confirmation IP address;

performing, by the system, a comparison of the confirmation IP address and the submission IP address; and transmitting, by the system and to the e-mail client, an image associated with the image data,
- wherein the image is based on the comparison of the confirmation IP address and the submission IP address.

10. The method of claim 9, wherein storing the image data and the submission IP address comprises:
temporarily storing the image data and the submission IP address in a cache.

11. The method of claim 10, further comprising:
populating, based on the second request and transmitting the image, an image loaded IP address corresponding to the confirmation IP address; and
updating the cache with the image loaded IP address.

12. The method of claim 11, further comprising:
scanning the cache at set time intervals for an update including the image loaded IP address; and
marking, based on identifying the update and a determination that the image loaded IP address and the submission IP address match, the user e-mail address as verified for a user account of the user in which the user e-mail address is stored.

13. The method of claim 9, further comprising:
wherein the image data indicates a uniform resource locator (URL).

14. The method of claim 9, further comprising:
transmitting, to the e-mail client, a second image indicating that the user e-mail address has not been verified.

15. A non-transitory computer-readable medium storing a set of instructions, the set of instructions comprising:
one or more instructions that, when executed by one or more processors of a device, cause the device to:
receive, from an e-mail client associated with an e-mail address of a user, an image request to access image data in an e-mail message,
- wherein the image request includes a confirmation Internet protocol (IP) address;

compare the confirmation IP address with a submission IP address stored in a cache,
- wherein the submission IP address is associated with a user request made by the user with an interaction party from whom the e-mail message originated;

transmit, to the e-mail client associated with the user, a first image based on a determination that the confirmation IP address and the submission IP address match,
- wherein the first image indicates that the e-mail address is verified; and transmit, to the e-mail client, a second image based on a determination that the confirmation IP address and the submission IP address do not match,
- wherein the second image indicates that the e-mail address is not verified.

16. The non-transitory computer-readable medium of claim 15, wherein the image data indicates a randomly generated uniform resource locator (URL).

17. The non-transitory computer-readable medium of claim 15, wherein the one or more instructions, when executed by the one or more processors, further cause the device to:

obtain the image data and the submission IP address from a database.

18. The non-transitory computer-readable medium of claim 17, wherein the database is a cache.

19. The non-transitory computer-readable medium of claim 15, wherein the one or more instructions, when executed by the one or more processors, further cause the device to:
   mark, under a user account of the user, the e-mail address as being verified based on the determination that the confirmation IP address and the submission IP address match.

20. The non-transitory computer-readable medium of claim 15, wherein the one or more instructions, when executed by the one or more processors, further cause the device to:
   mark, under a user account of the user, the e-mail address as being unverified based on the determination that the confirmation IP address and the submission IP address do not match.

* * * * *